US011215823B2

United States Patent
Li (10) Patent No.: US 11,215,823 B2
(45) Date of Patent: Jan. 4, 2022

(54) DUAL-IMAGE PROJECTION APPARATUS, A HEAD-UP DISPLAY APPARATUS, AND A VEHICLE VISION AUXILIARY SYSTEM

(71) Applicant: BOE TECHNOLOGY GROUP CO., LTD., Beijing (CN)

(72) Inventor: Dianmeng Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 849 days.

(21) Appl. No.: 16/063,928

(22) PCT Filed: Dec. 13, 2017

(86) PCT No.: PCT/CN2017/115912
§ 371 (c)(1),
(2) Date: Jun. 19, 2018

(87) PCT Pub. No.: WO2018/223646
PCT Pub. Date: Dec. 13, 2018

(65) Prior Publication Data
US 2021/0199963 A1   Jul. 1, 2021

(30) Foreign Application Priority Data
Jun. 8, 2017 (CN) .......................... 201710426972.0

(51) Int. Cl.
*G02B 27/01* (2006.01)
*G02B 30/56* (2020.01)
(Continued)

(52) U.S. Cl.
CPC .......... *G02B 27/0103* (2013.01); *B60K 35/00* (2013.01); *G02B 30/56* (2020.01);
(Continued)

(58) Field of Classification Search
CPC .. G02B 27/0103; G02B 30/56; G03H 1/2294; G03H 1/2205; G03H 2225/32;
(Continued)

(56) References Cited

U.S. PATENT DOCUMENTS 6,359,737 B1 * 3/2002 Stringfellow ...... G02B 27/0101
250/214 VT
9,291,819 B2 * 3/2016 Ferri ................... G02B 27/0101
(Continued)

FOREIGN PATENT DOCUMENTS

CN      102472894 A    5/2012
CN      103049083 A    4/2013
(Continued)

OTHER PUBLICATIONS

International Search Report & Written Opinion dated Mar. 12, 2018, regarding PCT/CN2017/115912.

*Primary Examiner* — Jade R Chwasz
(74) *Attorney, Agent, or Firm* — Intellectual Valley Law, P.C.

(57) ABSTRACT

A dual-image projection apparatus includes a light source, a spatial light modulator including a first modulation module and a second nodulation module, and a Fourier lens. The spatial light modulator is positioned at a front focal plane of the Fourier lens. The first modulation module modulates light from the light source through the Fourier lens to reproduce a first 2D holographic image and the second modulation module modulates the light through the Fourier lens to reproduce a plurality of second 2D holographic images. The dual-image projection apparatus further includes a first light-diffusing film to display the first 2D holographic image to produce a first virtual image and a plurality of second light-diffusing films to respectively dis-
(Continued)

play the plurality of second 2D holographic images sequentially in a rate to produce a 3D virtual image.

20 Claims, 2 Drawing Sheets (51) Int. Cl.
*B60K 35/00* (2006.01)
*G02F 1/1362* (2006.01)
*G03H 1/22* (2006.01)

(52) U.S. Cl.
CPC ..... *G02F 1/136277* (2013.01); *G03H 1/2205* (2013.01); *G03H 1/2294* (2013.01); *B60K 2370/1529* (2019.05); *B60K 2370/166* (2019.05); *B60K 2370/167* (2019.05); *B60K 2370/178* (2019.05); *G02F 2203/02* (2013.01); *G02F 2203/50* (2013.01); *G03H 2001/2213* (2013.01); *G03H 2210/20* (2013.01); *G03H 2210/30* (2013.01); *G03H 2222/13* (2013.01); *G03H 2222/34* (2013.01); *G03H 2225/22* (2013.01); *G03H 2225/32* (2013.01); *G03H 2225/52* (2013.01)

(58) Field of Classification Search
CPC ........... G03H 2225/22; G03H 2210/20; G03H 2222/34; G03H 2222/13; G03H 2001/2213; G03H 2210/30; G03H 2225/52; G02F 1/136277; G02F 2203/50; G02F 2203/02; B60K 35/00; B60K 2370/167; B60K 2370/166; B60K 2370/1529; B60K 2370/178
See application file for complete search history.

(56) References Cited

U.S. PATENT DOCUMENTS

| | | | |
|---|---|---|---|
| 10,649,208 B2* | 5/2020 | Li | B60K 35/00 |
| 10,983,423 B2* | 4/2021 | Sakai | G02B 5/10 |
| 2011/0157667 A1 | 6/2011 | Lacoste et al. | |
| 2012/0099170 A1* | 4/2012 | Shikii | G02B 27/0103 359/3 |
| 2013/0265622 A1* | 10/2013 | Christmas | G02B 30/26 359/9 |
| 2013/0321776 A1 | 12/2013 | Loong et al. | |
| 2014/0036374 A1* | 2/2014 | Lescure | G02B 27/0101 359/630 |
| 2021/0011286 A1* | 1/2021 | Morohashi | G02B 27/0101 |

FOREIGN PATENT DOCUMENTS

| | | |
|---|---|---|
| CN | 104155834 A | 11/2014 |
| CN | 205568907 U | 9/2016 |
| CN | 106896506 A | 6/2017 |

* cited by examiner

DUAL-IMAGE PROJECTION APPARATUS, A HEAD-UP DISPLAY APPARATUS, AND A VEHICLE VISION AUXILIARY SYSTEM

CROSS-REFERENCE TO RELATED APPLICATION

This application is a national stage application under 35 U.S.C. § 371 of International Application No. PCT/CN2017/115912, filed Dec. 13, 2017, which claims priority to Chinese Patent Application No. 201710426972.0, filed Jun. 8, 2017, the contents of which are incorporated by reference in the entirety.

TECHNICAL FIELD

The present invention relates to display technology, more particularly, to a projector, a head-up display device, and a vehicle vision auxiliary system.

BACKGROUND

A vehicle vision auxiliary system is configured to display various real-time status information such as speed, gas consumption and indicator information such as navigation, warning signal/instruction in terms of projection images at proper position in line of sight in front of a driver. When the driver needs to collect such information, it is desire to keep the line of sight of the driver on the road ahead. This prevents any visual blind spot being produced for the driver to look down for checking instrumental panel or central control equipment, ensuring safe driving.

Typical vehicle vision auxiliary system only provides 2D image projection, limiting its content and effectiveness to deliver urgent instruction or warning information to the driver. Conventional vehicle vision auxiliary system with multiple projection planes also needs multiple sets of reflectors in complicate configurations for projecting multiple images at different positions in line of sight of the driver for displaying different information.

SUMMARY

In an aspect, the present disclosure provides a dual-image projection apparatus. The apparatus includes a spatial light modulator including a first modulation module and a second nodulation module respectively receiving light beams from a light source. The apparatus further includes a Fourier lens disposed downstream of the light beams such that the spatial light modulator is positioned at a front focal plane of the Fourier lens. Additionally, the apparatus includes a first light-diffusing film and a a plurality of second light-diffusing films. The first modulation module is configured to load a first phase kinoform to modulate the light beams to have a first output light beam passing through the Fourier lens to reproduce a first 2D holographic image at a first back focal plane based on the first phase kinoform. The second modulation module is configured to load a plurality of second phase kinoforms one-by-one with a switch rate to modulate the light beams to have a second output light beam passing through the Fourier lens to respectively reproduce a plurality of second 2D holographic images with the switch rate respectively at a plurality of second back focal planes based on the plurality of second phase kinoforms. The first light-diffusing film is disposed at the first back focal plane to display the first 2D holographic image which is projected to a first virtual image. The plurality of second light-diffusing films is disposed at the plurality of second back focal planes to respectively display the plurality of second 2D holographic images which are projected to a plurality of second virtual images to produce a 3D holographic image.

Optionally, the spatial light modulator includes a phase modulator. The first modulation module includes a first array of liquid crystal on Silicon (LCOS) reflection phase modulators and the second modulation module includes a second array of LCOS reflection phase modulators.

Optionally, the first 2D holographic image is spatially separated from each of the plurality of second 2D holographic images.

Optionally, the first phase kinoform is at least a superposition of a phase-delay histogram, a grating kinoform, and a lens kinoform. The phase-delay histogram is calculated based on Fourier transformation of a first target image to be displayed. The grating kinoform is comprised of a first grating period in Fourier domain for determining an angular direction of the first output light beam. The lens kinoform is comprised of a first focal length in Fourier domain for determining the position of the first back focal plane for placing the first light-diffusing film.

Optionally, each of the plurality of second phase kinoforms is a superposition of at least a phase-delay histogram based on Fourier transformation of one of a plurality of second target images to be sequentially displayed. The grating kinoform is comprised of a second grating period in Fourier domain for determining an angular direction of the second output light beam. The lens kinoform is comprised of one of a plurality of second focal lengths in Fourier domain for determining respective positions of the plurality of second back focal planes for placing the plurality of second light-diffusing films. The second grating period is different from the first grating period.

Optionally, each of the first light-diffusing film and the plurality of second light-diffusing films includes a semitransparent film configured to display a corresponding 2D holographic image with a smoothening effect.

Optionally, the semitransparent film is made by a material selected from polymer-dispersed liquid crystal, polymer-stabilized liquid crystal, polyethylene terephthalate.

Optionally, any two adjacent second light-diffusing films have a spacing becoming smaller at more distal positions relative to the Fourier lens such that any two adjacent second virtual images having a substantially equal spacing.

Optionally, each of the plurality of second light-diffusing films includes an electroluminescent film made by polymer-dispersed liquid crystal or polymer-stabilized liquid crystal and configured to be fully transparent once a voltage is applied thereon and be semitransparent once no voltage is applied.

Optionally, the voltage is applied to the plurality of second light-diffusing films one-by-one in a rate synchronized with the switch rate of loading the plurality of second phase kinoforms. The rate is at least greater than 150 Hz.

Optionally, the apparatus includes multiple first modulation modules respectively for generating multiple first 2D holographic images spatially separated from each other with different angular direction respectively displayed on multiple first light-diffusing films.

Optionally, the apparatus includes multiple second modulation modules respectively for generating multiple sets of the plurality of second 2D holographic images spatially separated from each other with different angular direction. Each set of the plurality of second 2D holographic images is respectively displayed on a corresponding set of the plurality of second light-diffusing films.

Optionally, the apparatus further includes multiple light reflecting elements configured to direct light from the first light-diffusing film and the plurality of second light-diffusing films respectively to a viewer.

Optionally, the multiple light reflecting elements are configured to project the first 2D holographic image displayed on the first light-diffusing film as the first virtual image in front of the viewer and simultaneously project the plurality of the second 2D holographic images as the plurality of second 2D virtual images to form the 3D holographic image in front of the viewer at a different viewing angle.

Optionally, the apparatus further includes a beam shaping optical element configured to collimate and expand light beams from the light source to the spatial light modulator.

Optionally, the light source includes a first laser device emitting a first laser beam with red color spectrum, a second laser device emitting a second laser beam with green color spectrum, and a third laser device emitting a third laser beam with blue color spectrum.

Optionally, the light source comprises a first light-emitting diode emitting a first coherent light beam with red color spectrum, a second light-emitting diode emitting a second coherent light beam with green color spectrum, and a third light-emitting diode emitting a third coherent light beam with blue color spectrum.

In another aspect, the present disclosure provides a head-up display apparatus including the dual-image projection apparatus described herein for projecting to-be-displayed target images in front of a viewer.

In yet another aspect, the present disclosure provides a vehicle vision auxiliary system including a head-up display apparatus described herein disposed in a vehicle. The head-up display apparatus includes the dual-image projection apparatus for projecting to-be-displayed target images in front of a driver.

Optionally, the dual-image projection apparatus further includes multiple light reflecting elements including at least one reflector configured to reflect light from the first light-diffusing film and the plurality of second light-diffusing films to a front windshield of the vehicle and further reflected from the front windshield to eyes of a driver in the vehicle.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional vehicle vision auxiliary system has many technical problems and high manufacture cost due to complicate device structure and needs to be improved. Accordingly, the present disclosure provides, inter alia, a dual-image projection apparatus, a head-up display apparatus having the same, and a vehicle vision auxiliary system based on the head-up display apparatus that substantially obviate one or more of the problems due to limitations and disadvantages of the related art.

Figure 1:
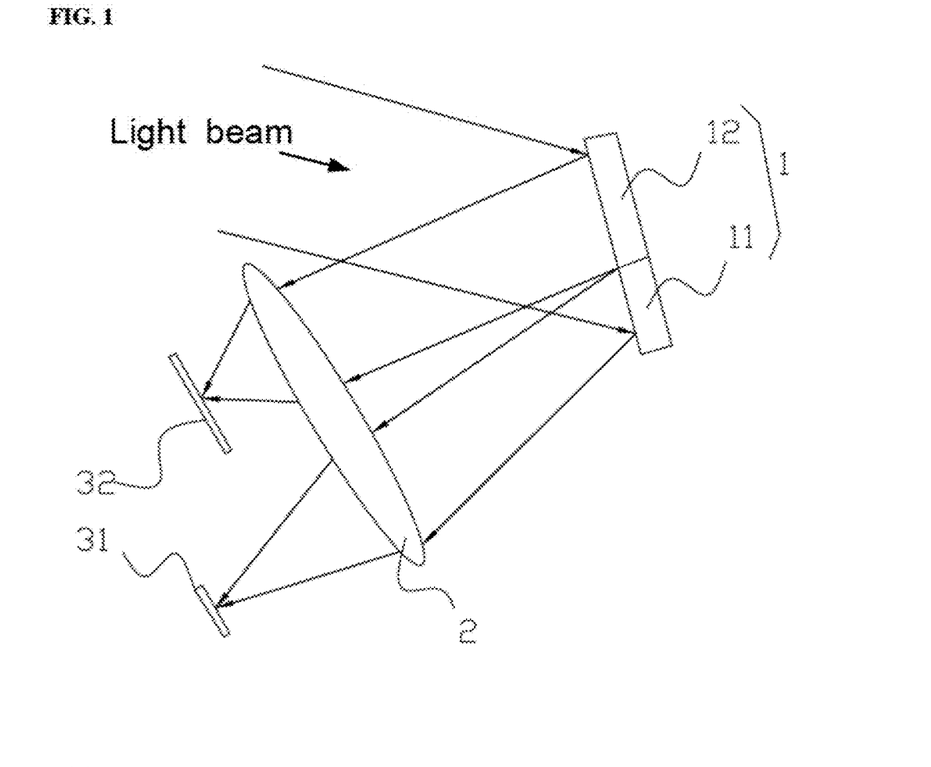
FIG. 1 is a schematic diagram of a dual-image projection apparatus according to some embodiments of the present disclosure.

In one aspect, the present disclosure provides a dual-image projection apparatus capable of displaying a three-dimensional augmented image and two-dimensional status image simultaneously. FIG. 1 is a schematic diagram of a dual-image projection apparatus according to some embodiments of the present disclosure. Referring to FIG. 1, along a downstream path of an incident light beam, a spatial light modulator 1, a Fourier transform lens (simply called Fourier lens) 2, and one or more image display films 31 or 32 are disposed. In an embodiment, the spatial light modulator 1 is disposed at a front focal plane of the Fourier lens 2. The incident light beam is from a coherent light source. The spatial light modulator 1 is configured to load a phase kinoform containing at least holographic data in Fourier domain calculated based on a target image and performing a phase modulation to the incident light beam using the phase kinoform to generate an output light beam towards the Fourier lens 2. As the spatial light modulator 1 is placed at the front focal plane of the Fourier lens 2, a two-dimensional (2D) holographic image can be produced as the output light beam after being modulated passes through the Fourier lens 2. The 2D holographic image is produced at a back focal plane of the Fourier lens 2 where one or more image display films 31 or 32 is disposed to display a real image which is simply a 2D holographic reproduction of the target image.

Optionally, the spatial light modulator 1 is a phase modulator. Optionally, the spatial light modulator 1 includes two modulation modules, a first modulation module 11 and a second modulation module 12 assembled together. Optionally, the first modulation module 11 and the second modulation module 12 are two partial regions of a single spatial light modulator 1. The first modulation module 11 is configured to load a first phase kinoform and be able to perform phase modulation to the incident light beam using the first phase kinoform and to generate a first output light beam through the Fourier lens 2 to produce a first 2D holographic image. The second modulation module 12 is configured to load a second phase kinoform and be able to perform phase modulation to the incident light beam using the second phase kinoform and to generate a second output light beam through the Fourier lens 2 to produce a second 2D holographic image. Optionally, the first 2D holographic image is at a first back focal plane having a first distance relative to the Fourier lens 2 and is displayed on the first image display film 31 disposed thereof. Optionally, the second 2D holographic image is at a second back focal plane having a second distance relative to the Fourier lens 2 and is displayed on the second image display film 32 disposed thereof. The first output light beam may be deviate from the second output light beam. The first distance of the first back focal plane may be different from the second distance of the second back focal plane. Thus, the first 2D holographic image may be spatially separated from the second 2D holographic image.

In an embodiment, the second modulation module 12 is configured to load a plurality of second phase kinoforms one-by-one with a switch rate. Then, the second modulation module 12 is able to perform phase modulation to the incident light beam sequentially using the plurality of second phase kinoforms to generate a second output light beam through the Fourier lens 2 to produce a plurality of second 2D holographic images. Depending on the plurality of second phase kinoforms containing different lens kinoform information used by the second modulation module 12, the plurality of second 2D holographic images can be produced at separate positions corresponding to different second focal planes of the Fourier lens. A three-dimensional (3D) holographic image can be produced with the plurality of second 2D holographic images mutually separate, provided that each of the plurality of second 2D holographic images contains a proper part of 2D information of a real target object and the switch rate is sufficiently high.

Optionally, the first 2D holographic image and the 3D holographic image produced by combining all the plurality of second 2D holographic images are produced at separate positions relative to the Fourier lens 2. Accordingly, the first image display film 31 is disposed at the first back focal plane to display the first 2D holographic image and a second image display film 32 can be disposed at one of second back focal planes to display one of the plurality of second 2D holographic images. Optionally, each of the first image display film 31 and the second image display film 32 can be an optical element that is either operated in transmission mode or an optical element that is operated in reflection mode.

In a specific embodiment, the first phase kinoform is holographic data in Fourier domain calculated by a host computer based on a first target image. The host computer sends the first phase kinoform to a first driver. The first driver is configured to control the first modulation module 11 based on the first phase kinoform to perform phase modulation. Similarly, the host computer also send the second phase kinoform based on a second target image to a second driver to control the second modulation module for performing the phase modulation.

Optionally, the first phase kinoform and the second phase kinoform are phase-delay histograms generated by the host computer using a corresponding algorithm, for example, fast phase recovery algorithm. The phase-delay histogram provides a distribution of phase delays in an optical field, for example, a light beam incident to a multi-reflector-based spatial light modulator. Thus, the light beam can be modulated in phase when it is reflected by the spatial light modulator controlled by the driver based on the loaded phase kinoform. Optionally, the phase kinoform can be a superposition of multiple kinoforms respectively containing different information other than the phase delay for providing additional spatial modulations to the light beam, such as adjusting angular direction, focal length, etc.

Figure 2:
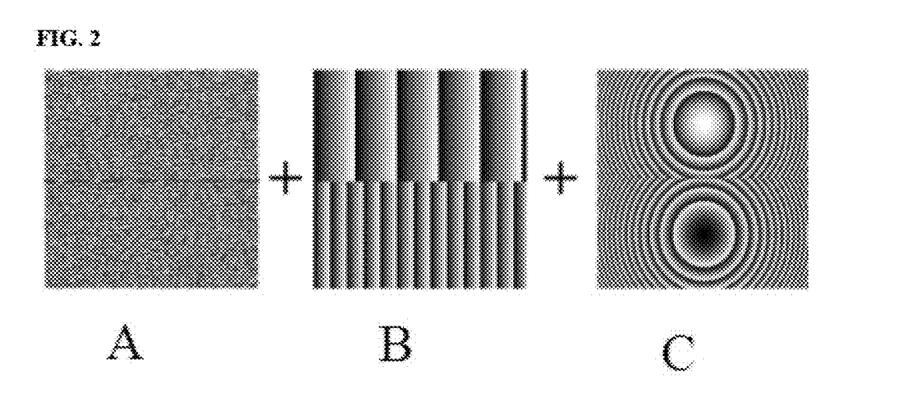
FIG. 2 is an exemplary diagram of a phase kinoform in Fourier domain according to an embodiment of the present disclosure.

FIG. 2 is an exemplary diagram of a phase kinoform in Fourier domain according to an embodiment of the present disclosure. Referring to FIG. 2, the phase kinoform is a superposition of at least a phase-delay histogram A, a grating kinoform B, and a lens kinoform C. The phase-delay histogram A has been described above. The grating kinoform B is comprised of information about a grating period imposed on the spatial light modulator. For a same incident light beam, different grating period may result in different deflection angle. By setting different grating period and generating a corresponding grating kinoform B in Fourier domain, the spatial light modulator 1 can cause the incident light beam to be deflected to different angle. The lens kinoform C is comprised of information about a focal length of the Fourier lens 2 to properly expand or confine the light beam. By setting different focal length and generating a corresponding lens kinoform C in Fourier domain, the light outputted from the spatial light modulator 1 at the front side of Fourier lens 2 can be focused to reproduce a holographic image at different distance at the back side of the Fourier lens 2.

Additionally, the second modulation module 12 is configured to load multiple different second phase kinoforms one by one according to a certain switch rate. Different phase kinoforms contain different lens kinoforms. In other words, the second modulation module 12 is configured to load different phase kinoforms with different focal length information one by one according to a certain switch rate. These different phase kinoforms will result in different reconstructed holographic images at different distances relative to the Fourier lens 2. In an embodiment, when the switch rate is greater than 150 Hz, due to visual persistence effect of human eye, people will recognize the multiple sequentially displayed 2D holographic images as a 3D holographic image.

Optionally, by setting the grating period in the grating kinoform of the first phase kinoform to be different from the grating period in the grating kinoform of the second phase kinoform, the first output light beam outputted from the first modulation module 11 can be deflected to a different angle from that of the second output light outputted from the second modulation module 12 so that the first 2D holographic image can be spatially separated without overlapping from the 3D holographic image produced by the plurality of second 2D holographic images.

Optionally, by setting different focal lengths in the lens kinoforms among the different second phase kinoforms, different second 2D holographic images reconstructed at the back side of the Fourier lens 2 can be at different distances relative to the Fourier lens, so as to facilitate a formation of a 3D holographic image. Optionally, the plurality of second 2D holographic images is formed with equal spacing between any two adjacent holographic images.

In the embodiment of FIG. 1, the spatial light modulator 1 includes a pure phase modulator for light signal. In a specific embodiment, the spatial light modulator 1 is a liquid-crystal-based spatial light modulator (LC-SLM). The spatial light modulator 1 includes a first Liquid crystal on Silicon (LCOS) device for forming the first modulation module 11 and a second LCOS device for forming the second modulation module 12. Each LCOS device is an array of micro-sized liquid crystal display apparatus in reflection mode. In the embodiment, the LCOS device is used to perform phase modulation to incident light beam based on loaded phase kinoform. The pure phase spatial light modulator only modulates the incident light in phase. Comparing to other spatial light modulators (such as amplitude modulator, phase/amplitude hybrid modulator), it can conduct any wavefront modulation and be advantageous in high diffraction efficiency, high accuracy, and flexibility in light modulation. Pure phase spatial light modulator also is advantageous in its small form factor, high integration, and low cost. Using the LCOS-based pure phase spatial light modulator to replace multiple reflectors in the conventional projection apparatus, the structure of dual-image projection apparatus can be substantially simplified and manufacture cost can be substantially reduced, particularly when only one spatial light modulator is used therein as shown in FIG. 1.

Optionally, the first LCOS device and the second LCOS device can be two individually formed modulators. Optionally, the first LCOS device and the second LCOS device can two sub-regions of one LCOS device respectively for handling the first phase kinoform and the second kinoform. Optionally, both the first LCOS device and the second LCOS device can be controlled by a common driver formed on a common printed circuit board.

Optionally, the dual-image projection apparatus disclosed in the present disclosure can includes two pure phase spatial light modulators including a first pure phase spatial light modulator configured as the first modulation module 11 and a second pure phase spatial light modulator configured as the second modulation module 12.

Optionally, the dual-image projection apparatus includes multiple first modulation modules. Different first 2D holographic images reconstructed at spatially separate locations after the output light beams reflected from different ones of the multiple first modulation modules pass through the Fourier lens. In particular, in the first phase kinoform loaded to different first modulation module 11 the grating period in the grating kinoform B is different, thus the deflection angle of incident light beam caused by the corresponding phase modulation will also be different so that different first 2D holographic images reconstructed by different first modulation module will be spatially separated. By disposing multiple first modulation modules 11 in the dual-image projection apparatus, multiple first 2D holographic images can be reconstructed to meet requirement of displaying multi-categories information and large amount of information. In an example, the multiple first modulation modules 11 include two modulation modules. In an example, the multiple first modulation modules 11 include three modulation modules. In an example, the multiple first modulation modules 11 include four modulation modules. In an example, the multiple first modulation modules 11 include five or more modulation modules.

Similarly, the dual-image projection apparatus includes multiple second modulation module 12. Optionally, any two second 2D holographic images respectively reconstructed after the corresponding output light beams reflected from two different second modulation modules 12 and through the Fourier lens are spatially separated from each other. Optionally, the number of the multiple second modulation modules 12 can be selected from 2, 3, 4, 5, or more.

Figure 3:
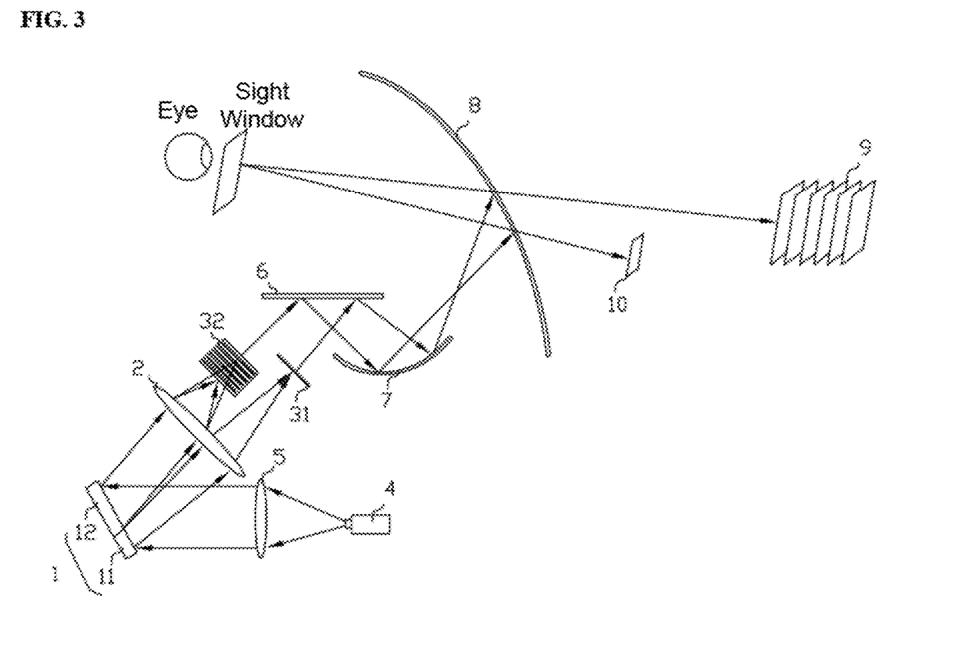
FIG. 3 is a schematic diagram of a dual-image projection apparatus according to some embodiments of the present disclosure.

FIG. 3 is a schematic diagram of a dual-image projection apparatus according to some embodiments of the present disclosure. The dual-image projection apparatus shown in FIG. 3 is expanded from the dual-image projection apparatus shown in FIG. 1. Referring to FIG. 3, the dual-image projection apparatus includes a light source 4 and a light shaping optical element 5. In an embodiment, the light source 4 is a coherent light source. Optionally, the light source 4 includes a first laser device emitting a first laser beam with red color spectrum, a second laser device emitting a second laser beam with green color spectrum, and a third laser device emitting a third laser beam with blue color spectrum, so that a color holographic image can be obtained. Optionally, the light source 4 includes a first light-emitting diode emitting a first coherent light beam with red color spectrum, a second light-emitting diode emitting a second coherent light beam with green color spectrum, and a third light-emitting diode emitting a third coherent light beam with blue color spectrum, so that a color holographic image can be obtained. The light shaping optical element 5 is disposed between the light source 4 and the spatial light modulator 1 and configured to collimate and expand light beams from the light source 4 to the spatial light modulator 1.

Referring to FIG. 3, the first image display film 31 includes a first light-diffusing film configured to display the first 2D holographic image and also allow light to at least partially pass through thereof. Additionally, the first light-diffusing film can scatter light and smoothen the image displayed thereof. In particular, the first light-diffusing film 31 is disposed at a location of a first back focal plane of the Fourier lens 2 to display a corresponding first 2D holographic image reconstructed thereof. The first back focal plane is determined by a first focal length of the Fourier lens included in the lens kinoform of the first phase kinoform loaded to the first modulation module 11. Optionally, the first light-diffusing film 31 is a semitransparent polymer film. Optionally, the first light-diffusing film 31 is based on polyethylene terephthalate (PET) capable of allowing the incident light beam to pass through, expanded, and smoothened thereof. The light passed through can be further directed via other light reflecting elements to a viewer.

In the embodiment, the second image display film 32 can be implemented in many ways. Optionally, the second image display film 32 is a light-diffusing assembly including a plurality of second light-diffusing films respectively disposed with a separation from one another along the light transmission direction. In an embodiment, the number of second light-diffusing films is configured to be the same as a number of the plurality of second phase kinoforms loaded to the second modulation module 12. Each of the number of second light-diffusing films correspondingly is disposed at a location of a second 2D holographic image reconstructed at one of the number of second back focal planes. Such a location is the same position determined by a focal length information in the lens kinoform of the corresponding one of the number of second phase kinoforms. In fact, the second light-diffusing film is to display the corresponding one of second 2D holographic images. Different second 2D holographic images are displayed on different second light-diffusing films.

Figure 4:
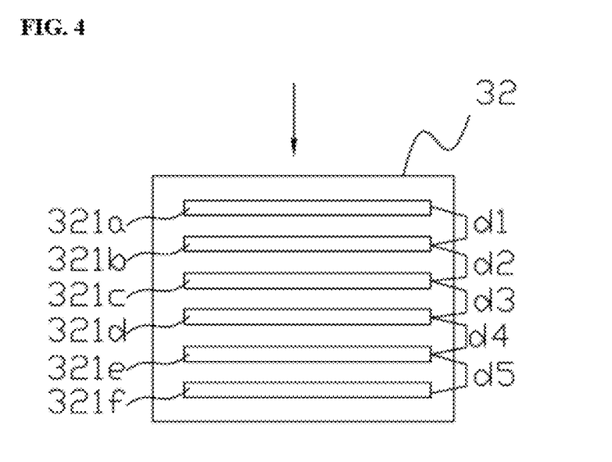
FIG. 4 is a schematic diagram of a light-diffusing assembly used in the dual-image projection apparatus of FIG. 3.

FIG. 4 is a schematic diagram of a light-diffusing assembly used in the dual-image projection apparatus of FIG. 3. Referring to FIG. 4, the light-diffusing assembly 32 includes multiple second light-diffusing films: 321a~321f disposed sequentially along the light transmission direction with a spacing between every neighbor.

Optionally, the second light-diffusing film is an electroluminescent film configured to be fully transparent once a voltage is applied thereon and be semitransparent once no voltage is applied. Optionally, the second light-diffusing film is made by polymer-dispersed liquid crystal or polymer-stabilized liquid crystal. In an embodiment, the voltage is applied to the plurality of second light-diffusing films of the light-diffusing assembly 32 one-by-one in a rate synchronized with the switch rate of loading the plurality of second phase kinoforms to the second modulation module 12. Preferably, the rate is at least greater than 150 Hz. By applying a voltage to one of second light-diffusing films (321a~321f) in a rate synchronized with the switch rate of loading the corresponding second phase kinoform, it is the only light-diffusing film is semitransparent capable of displaying the corresponding second 2D holographic image reconstructed based on the corresponding second phase kinoform while all other second light-diffusing films are transparent to allow light to pass. The only one second light-diffusing film that is displaying the second 2D holographic image also effective allow light to partially pass through with light expansion and smoothening effect.

In the embodiment, the dual-image projection apparatus of FIG. 3 further includes multiple light reflecting elements for directing light from either the first light-diffusing film 31 or one of second light-diffusing films (321a~321f) to a viewer so that the viewer can see at least a first virtual image of the first 2D holographic image displayed by the first diffusing film and/or a virtual 3D holographic image of the plurality of second 2D holographic images displayed one-by-one sequentially in a rate on the second light-diffusing films. Optionally, the viewer can see these virtual images without leaving a nominal line of sight. Optionally, the light reflecting elements includes at least one reflector.

Referring to FIG. 3, the dual-image projection apparatus includes two reflectors 6 and 7. The reflectors 6 and 7 are configured to reflect output light beams from both the first light-diffusing film 31 and the second light-diffusing film 32 to a front windshield 8. Further, the light beams are reflected from the front windshield 8 to the viewer. The viewer's eye sight is in a line towards front direction. Through the front windshield, the viewer is able to see a 2D virtual image 10 corresponding to a target image and a 3D virtual image 9 without leaving his line of sight.

Optionally, any two adjacent second light-diffusing films have a spacing becoming smaller at more distal positions relative to the Fourier lens such that any two adjacent second 2D virtual images of the second 2D holographic images having a substantially equal spacing. With this condition, the image clarity of different second 2D holographic images will be substantially the same, effectively enhancing display effect of the 3D virtual image seen by the viewer.

In a specific embodiment, the two reflectors 6 and 7 and the front windshield 8 can be viewed as part of a head-up display (HUD), which is equivalent to an ideal lens that uses a following formula to describe a relationship between its focal length, f, a distance of each second light-diffusing film relative to the ideal lens, Od, and a distance of one of 2D holographic image relative to the ideal lens, Vd:

$$\frac{1}{Od} - \frac{1}{Vd} = \frac{1}{f}$$

If the focal length f and the distance Vd are known, the distance Od can be deduced using the above formula. In an example of having multiple 2D holographic images associated with the 3D virtual image 9 to be realized at about 5 m to 7.5 m with equal spacing, assuming that f=200 mm and a driver is 800 mm away from the front windshield 8, a first 2D holographic image 321a most proximal to the Fourier lens 2 is positioned at 5000 mm which gives a distance Vd of the 2D holographic image relative to the ideal lens as 5000−800=4200 mm. Therefore, the corresponding distance Od of a corresponding second light-diffusing film relative to the ideal lens can be calculated to be 190.91 mm. Similarly, if distances of other 2D holographic images (321b~321f) relative to the ideal lens are provided and listed in an order from far to near: 5500 mm, 6000 mm, 6500 mm, 7000 mm, and 7500 mm with equal spacing between any neighbors, the respective distances Od of corresponding second light-diffusing films relative to the ideal lens can be calculated to be: 191.84 mm, 192.59 mm, 193.22 mm, 193.75 mm, and 194.20 mm. The spacing d1~d5 between two adjacent second light-diffusing films, in an order from near to far relative to the Fourier lens, can be deduced to be: d1=0.92 mm, d2=0.75 nu, d3=0.63 mm, d4=0.53 mm, and d5=0.45 mm.

In another aspect, the present disclosure provides a head-up display apparatus including the dual-image projection apparatus described herein. The head-up display apparatus is configured to project a virtual image of a to-be-displayed target image in front the line of sight of a person. In addition, the head-up display apparatus is configured to provide a 3D virtual image. The head-up display apparatus is capable of simultaneously projecting a 2D image and a 3D image based on a much simplified structure and reduced cost.

In yet another aspect, the present disclosure provides a vehicle vision auxiliary system which includes a head-up display apparatus described herein disposed in a vehicle. The head-up display apparatus includes the dual-image projection apparatus for projecting to-be-displayed target images in front of a driver. The dual-image projection apparatus further includes multiple light reflecting elements including at least one reflector configured to reflect light from the first light-diffusing film and the plurality of second light-diffusing films to a front windshield of the vehicle and further reflected from the front windshield to eyes of a driver in the vehicle. Optionally, the driver is able to see the projected images in the line of sight and read information displayed thereof without need to look down or sideway, substantially enhance driving safety.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term"the invention". "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A dual-image projection apparatus comprising:
   a spatial light modulator including a first modulation module and a second modulation module respectively receiving light beams from a light source;
   a Fourier lens disposed downstream of the light beams such that the spatial light modulator is positioned at a front focal plane of the Fourier lens;
   a first light-diffusing film;
   a plurality of second light-diffusing films;

wherein the first modulation module is configured to load a first phase kinoform to modulate the light beams to have a first output light beam passing through the Fourier lens to reproduce a first 2D holographic image at a first back focal plane based on the first phase kinoform, the second modulation module is configured to load a plurality of second phase kinoforms one-by-one with a switch rate to modulate the light beams to have a second output light beam passing through the Fourier lens to respectively reproduce a plurality of second 2D holographic images with the switch rate respectively at a plurality of second back focal planes based on the plurality of second phase kinoforms;

the first light-diffusing film is disposed at the first back focal plane to display the first 2D holographic image which is projected to a first virtual image; and the plurality of second light-diffusing films is disposed at the plurality of second back focal planes to respectively display the plurality of second 2D holographic images which are projected to a plurality of second virtual images to produce a 3D holographic image.

2. The dual-image projection apparatus of claim 1, wherein the spatial light modulator comprises a phase modulator, wherein the first modulation module comprises a first array of liquid crystal on Silicon (LCOS) reflection phase modulators and the second modulation module comprises a second array of LCOS reflection phase modulators.

3. The dual-image projection apparatus of claim 1, wherein the first 2D holographic image is spatially separated from each of the plurality of second 2D holographic images.

4. The dual-image projection apparatus of claim 1, wherein the first phase kinoform is at least a superposition of a phase-delay histogram, a grating kinoform, and a lens kinoform; wherein the phase-delay histogram is calculated based on Fourier transformation of a first target image to be displayed, the grating kinoform is comprised of a first grating period in Fourier domain for determining an angular direction of the first output light beam, and the lens kinoform is comprised of a first focal length in Fourier domain for determining the position of the first back focal plane for placing the first light-diffusing film.

5. The dual-image projection apparatus of claim 4, wherein each of the plurality of second phase kinoforms is a superposition of at least a phase-delay histogram based on Fourier transformation of one of a plurality of second target images to be sequentially displayed, the grating kinoform is comprised of a second grating period in Fourier domain for determining an angular direction of the second output light beam, and the lens kinoform is comprised of one of a plurality of second focal lengths in Fourier domain for determining respective positions of the plurality of second back focal planes for placing the plurality of second light-diffusing films, wherein the second grating period is different from the first grating period.

6. The dual-image projection apparatus of claim 1, wherein each of the first light-diffusing film and the plurality of second light-diffusing films comprises a semitransparent film configured to display a corresponding 2D holographic image with a smoothening effect.

7. The dual-image projection apparatus of claim 6, wherein the semitransparent film is made by a material selected from polymer-dispersed liquid crystal, polymer-stabilized liquid crystal, polyethylene terephthalate.

8. The dual-image projection apparatus of claim 1, wherein any two adjacent second light-diffusing films have a spacing becoming smaller at more distal positions relative to the Fourier lens such that any two adjacent second virtual images have a substantially equal spacing.

9. The dual-image projection apparatus of claim 1, wherein each of the plurality of second light-diffusing films comprises an electroluminescent film made by polymer-dispersed liquid crystal or polymer-stabilized liquid crystal configured to be fully transparent once a voltage is applied thereon and be semitransparent once no voltage is applied.

10. The dual-image projection apparatus of claim 9, wherein the voltage is applied to the plurality of second light-diffusing films one-by-one in a rate synchronized with the switch rate of loading the plurality of second phase kinoforms, wherein the rate is at least greater than 150 Hz.

11. The dual-image projection apparatus of claim 1, comprising multiple first modulation modules respectively for generating multiple first 2D holographic images spatially separated from each other with different angular directions respectively displayed on multiple first light-diffusing films.

12. The dual-image projection apparatus of claim 1, comprising multiple second modulation modules respectively for generating multiple sets of the plurality of second 2D holographic images spatially separated from each other with different angular directions, each set of the plurality of second 2D holographic images being respectively displayed on a corresponding set of the plurality of second light-diffusing films.

13. The dual-image projection apparatus of claim 1, further comprising multiple light reflecting elements configured to direct light from the first light-diffusing film and the plurality of second light-diffusing films respectively to a viewer.

14. The dual-image projection apparatus of claim 13, wherein the multiple light reflecting elements are configured to project the first 2D holographic image displayed on the first light-diffusing film as the first virtual image in front of the viewer and simultaneously project the plurality of the second 2D holographic images as the plurality of second 2D virtual images to form the 3D holographic image in front of the viewer at a different viewing angle.

15. The dual-image projection apparatus of claim 1, further comprising a beam shaping optical element configured to collimate and expand light beams from the light source to the spatial light modulator.

16. The dual-image projection apparatus of claim 1, wherein the light source comprises a first laser device emitting a first laser beam with red color spectrum, a second laser device emitting a second laser beam with green color spectrum, and a third laser device emitting a third laser beam with blue color spectrum.

17. The dual-image projection apparatus of claim 1, wherein the light source comprises a first light-emitting diode emitting a first coherent light beam with red color spectrum, a second light-emitting diode emitting a second coherent light beam with green color spectrum, and a third light-emitting diode emitting a third coherent light beam with blue color spectrum.

18. A head-up display apparatus comprising the dual-image projection apparatus of claim 1 for projecting to-be-displayed target images in front of a viewer.

19. A vehicle vision auxiliary system comprising a head-up display apparatus of claim 18 disposed in a vehicle, the head-up display apparatus comprising the dual-image projection apparatus for projecting to-be-displayed target images in front of a driver.

20. The vehicle vision auxiliary system of claim 19, wherein the dual-image projection apparatus further comprises multiple light reflecting elements including at least one reflector configured to reflect light from the first light-diffusing film and the plurality of second light-diffusing films to a front windshield of the vehicle and further reflected from the front windshield to eyes of a driver in the vehicle.

* * * * *